United States Patent
Schygge et al.

(10) Patent No.: US 9,226,444 B2
(45) Date of Patent: Jan. 5, 2016

(54) BATTERY POWERED LAWN CARE VEHICLE WITH EFFICIENT DRIVE CONTROLLER

(75) Inventors: Sebastian Schygge, Huskvarna (SE); Daniel Carlsson, Tvååker (SE); Lars Dernebo, Ödeshög (SE); Peter Mejegård, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 93 days.

(21) Appl. No.: 14/131,837

(22) PCT Filed: Jul. 14, 2011

(86) PCT No.: PCT/US2011/044059
§ 371 (c)(1),
(2), (4) Date: Jan. 9, 2014

(87) PCT Pub. No.: WO2013/009323
PCT Pub. Date: Jan. 17, 2013

(65) Prior Publication Data
US 2014/0150390 A1     Jun. 5, 2014

(51) Int. Cl.
*A01D 69/00*     (2006.01)
*A01D 34/00*     (2006.01)
(Continued)

(52) U.S. Cl.
CPC .............. *A01D 34/006* (2013.01); *A01D 34/64* (2013.01); *A01D 34/78* (2013.01); *A01D 69/02* (2013.01); *B60L 15/20* (2013.01)

(58) Field of Classification Search
CPC ... A01D 34/00; A01D 34/001; A01D 34/008; A01D 34/006; A01D 34/78; A01D 34/69; A01D 34/6806; A01D 69/00; A01D 69/02; A01D 34/64

USPC .............. 56/10.8, 10.1, 11.9, 11.1, 12.8, 56/10.2 A–10.2 E, 10.2 R; 180/65.6, 65.1, 180/65.8; 318/34, 51; 701/22
See application file for complete search history.

(56) References Cited

U.S. PATENT DOCUMENTS 3,299,982 A   1/1967   Bacon
3,809,975 A   5/1974   Bartels et al.
(Continued)

FOREIGN PATENT DOCUMENTS

JP   10191743 A2   7/1998

OTHER PUBLICATIONS

International Preliminary Report of Patentability of PCT/US2011/044059 issued Feb. 11, 2014, all enclosed pages cited.
(Continued)

*Primary Examiner* — Robert Pezzuto
(74) *Attorney, Agent, or Firm* — Nelson Mullins Riley & Scarborough LLP

(57) ABSTRACT

A riding lawn care vehicle may include a battery power source, an electric drive motor, at least one blade drive motor, a current sensor, and a drive controller. The electric drive motor may be powered by the battery power source. The electric drive motor may be operably coupled to a wheel of the riding lawn care vehicle to provide drive power for the riding lawn care vehicle. The at least one blade drive motor may be powered by the battery power source. The at least one blade drive motor may be operably coupled to at least one cutting blade of the riding lawn care vehicle. The current sensor may be disposed to monitor total current drawn from the battery power source. The drive controller may receive total current data from the current sensor and provide a drive control signal related to operation of the electric drive motor based on the total current data.

26 Claims, 8 Drawing Sheets

(51) Int. Cl.
  *A01D 69/02* (2006.01)
  *A01D 34/64* (2006.01)
  *A01D 34/78* (2006.01)
  *B60L 15/20* (2006.01)

(56) References Cited

U.S. PATENT DOCUMENTS

| | | | |
|---|---|---|---|
| 4,809,489 | A | 3/1989 | Johansson |
| 4,882,896 | A | 11/1989 | Wilcox et al. |
| 5,042,238 | A | 8/1991 | White, III et al. |
| 5,406,778 | A | 4/1995 | Lamb et al. |
| 5,502,957 | A | 4/1996 | Robertson |
| 5,564,721 | A | 10/1996 | Wians |
| 5,656,919 | A | 8/1997 | Proctor et al. |
| 5,718,534 | A | 2/1998 | Neuling |
| 5,790,355 | A | 8/1998 | Ishmael |
| 5,906,088 | A | 5/1999 | Inui et al. |
| 6,408,967 | B1 | 6/2002 | Huntsberger et al. |
| 6,826,895 | B2 | 12/2004 | Iida et al. |
| 6,857,253 | B2 | 2/2005 | Reimers et al. |
| 7,594,377 | B1 | 9/2009 | Jansen et al. |
| 7,610,975 | B1 | 11/2009 | Gust et al. |
| 8,055,399 | B2 | 11/2011 | Wyatt et al. |
| 8,191,342 | B2 | 6/2012 | Ishii et al. |
| 8,572,939 | B2 | 11/2013 | Koike et al. |
| 2003/0000567 | A1 | 1/2003 | Lynn |
| 2006/0059879 | A1 | 3/2006 | Edmond |
| 2007/0125056 | A1 | 6/2007 | Edmond |
| 2008/0234096 | A1 | 9/2008 | Joshi et al. |
| 2008/0264026 | A1 | 10/2008 | Ishii et al. |
| 2009/0192691 | A1 | 7/2009 | O'Connor et al. |
| 2009/0201650 | A1 | 8/2009 | Hauser et al. |
| 2011/0155486 | A1 | 6/2011 | Iwaki et al. |

OTHER PUBLICATIONS

International Search Report and Written Opinion of PCT/US2011/044073 mailed Dec. 12, 2011, all enclosed pages cited.
International Search Report and Written Opinion of PCT/US2011/044071 mailed Dec. 13, 2011, all enclosed pages cited.
International Search Report and Written Opinion of PCT/US2011/043964 mailed Dec. 13, 2011, all enclosed pages cited.
International Search Report and Written Opinion of PCT/US2011/044059 mailed Dec. 13, 2011, all enclosed pages cited.
International Search Report and Written Opinion of PCT/US2011/044051 mailed Dec. 14, 2011, all enclosed pages cited.

BATTERY POWERED LAWN CARE VEHICLE WITH EFFICIENT DRIVE CONTROLLER

TECHNICAL FIELD

Example embodiments generally relate to lawn care vehicles and, more particularly, relate to a battery powered lawn care vehicle having an efficient drive controller that may be fully automated,

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines (e.g., less than 200 cubic centimeters (cc)) and are relatively inexpensive. Meanwhile, at the other end of the spectrum, riding lawn mowers, such as lawn tractors, can be quite large and sometimes have engines exceeding 400 cc. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

Rising fact costs and an increased awareness of pollution and other byproducts of fossil fact burning engines have generated much interest in the development of cleaner energy sources. Battery powered vehicles have a potential for reducing dependence on fossil fuels. However, given the long history of development of products that burn fossil fuels, it should be appreciated that many new design considerations that were not issues previously may come into play when battery powered vehicles are employed.

BRIEF SUMMARY OF SOME EXAMPLES

Some example embodiments may provide a battery powered lawn care vehicle having an automated efficient drive controller. In this regard, for example, a controller or other processing circuitry may be provided to monitor various operational aspects of the battery powered lawn care vehicle, and vehicle operation may be controlled to improve drive efficiency. In one example embodiment, various parameters such as total current drawn for all sources on the vehicle may be monitored and various aspects of vehicle operation such as cutting performance, drive motor performance, and peripheral device performance may be controlled based on the monitored parameters.

in one example embodiment, a riding lawn care vehicle is provided. The riding lawn care vehicle may include a battery power source, an electric drive motor, at least one blade drive motor, a current sensor, and a drive controller. The electric drive motor may be powered by the battery power source. The electric drive motor may be operably coupled to a wheel of the riding lawn care vehicle to provide drive power for the riding lawn care vehicle. The at least one blade drive motor may be powered by the battery power source. The at least one blade drive motor may be operably coupled to at least one cutting blade of the riding lawn care vehicle. The current sensor may be disposed to monitor total current drawn from the battery power source. The drive controller may receive total current data from the current sensor and provide a drive control signal related to operation of the electric drive motor based on the total current data.

In another example embodiment, a drive controller for a riding lawn care vehicle is provided. The riding lawn care vehicle may include a battery power source, an electric drive motor, and at least one blade drive motor. The electric drive motor may be powered by the battery power source. The electric drive motor may be operably coupled to a wheel of the riding lawn care vehicle to provide drive power for the riding lawn care vehicle. The at least one blade drive motor may be powered by the battery power source. The at least one blade drive motor may be operably coupled to at least one cutting blade of the riding lawn care vehicle. The drive controller may include a device interface and processing circuitry. The device interface may be configured to receive total current data from a current sensor disposed to monitor total current drawn from the battery power source. The processing circuitry may be configured to receive total current data from the device interface and provide a drive control signal related to operation of the electric drive motor based on the total current data.

in another example embodiment, a method of controlling drive speed of a riding lawn care vehicle is provided. The riding lawn care vehicle may include a battery power source, an electric drive motor and at least one blade motor powered by the battery power source. The electric drive motor may be operably coupled to a wheel of the riding lawn care vehicle to provide drive power for the riding lawn care vehicle. The at least one blade drive motor may be operably coupled to at least one cutting blade of the riding lawn care vehicle. The method may include receiving total current data from a current sensor disposed to monitor total current drawn from the battery power source and providing a drive control signal related to operation of the electric drive motor based on the total current data.

In still another example embodiment, adding lawn care vehicle is provided. The riding lawn care vehicle may include a battery power source, an electric drive motor, at least one blade drive motor, a current sensor, and a drive controller. The electric drive motor may be powered by the battery power source. The electric drive motor may be operably coupled to a wheel of the riding lawn care vehicle to provide drive power for the riding lawn care vehicle. The at least one blade drive motor may be powered by the battery power source. The at least one blade drive motor may be operably coupled to at least one cutting blade of the riding lawn care vehicle. The current sensor may be disposed to monitor current drawn from the battery power source by the electric drive motor and the at least one blade drive motor. The drive controller may receive current data from the current sensor and provide a drive control signal related to operation of the electric drive motor based on the current data.

Some example embodiments may improve the cutting performance and/or the efficiency of a battery powered lawn care vehicle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
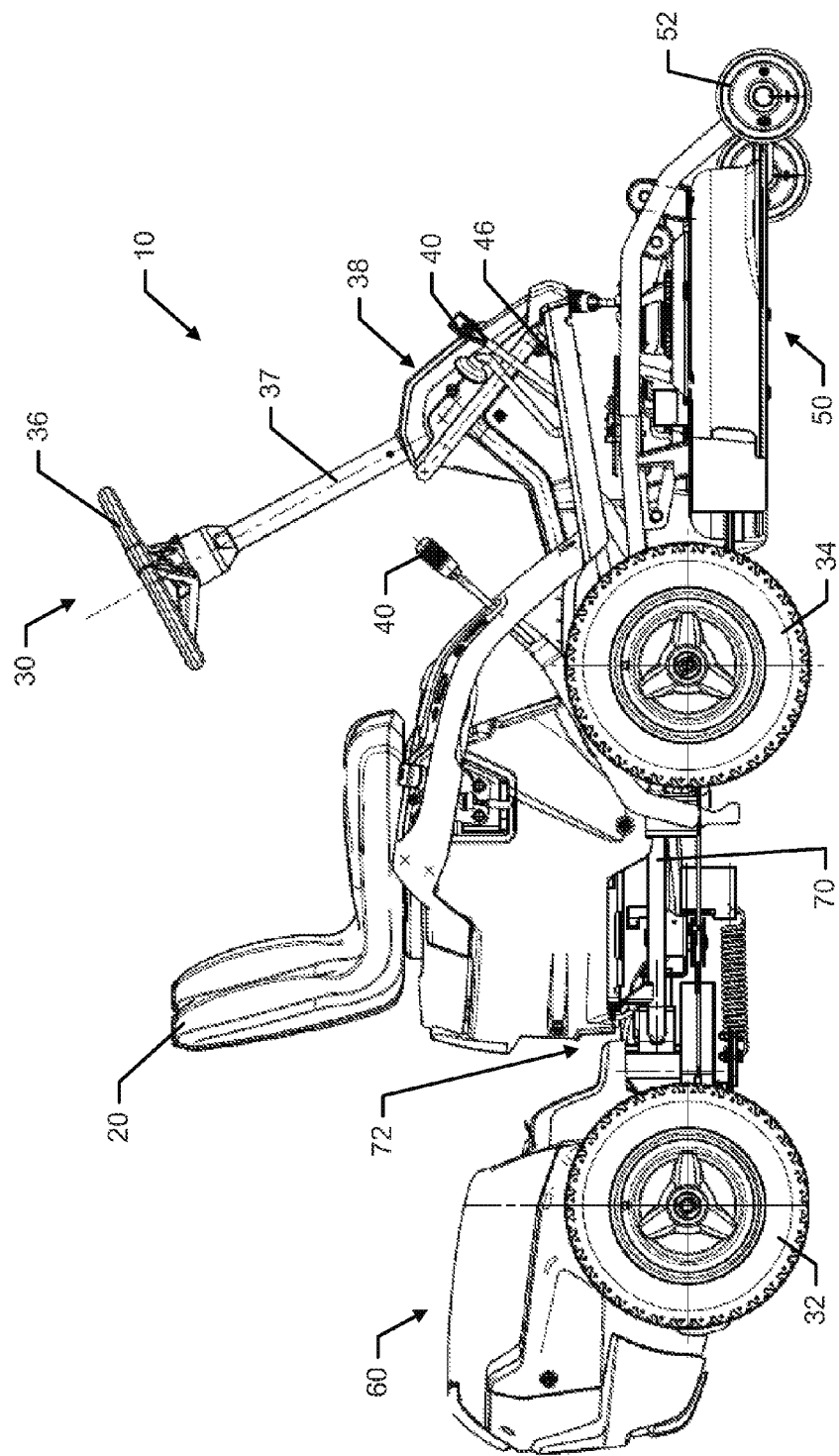
FIG. 1A illustrates a perspective view of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the cutting performance and/or the efficiency of a battery powered lawn care vehicle. In this regard, for example, some example embodiments may provide a controller or other processing circuitry for use on the battery powered lawn care vehicle. One or more sensors may be provided on the battery powered lawn care vehicle to monitor corresponding one or more parameters related to the operational performance of the battery powered lawn care vehicle. In some examples, total current drawn from a battery power source of the battery powered lawn care vehicle may be one of the parameters monitored by the one or more sensors. The total current, which may be substantially reflective of the current drawn by the drive motor or motors and the cutting motor or motors, may indicate certain operational conditions for which modifications to the performance of the battery operated vehicle may be warranted. The controller or other processing circuitry may automatically make such modifications to improve the performance and/or efficiency of the battery powered lawn care vehicle.

Figure 1B:
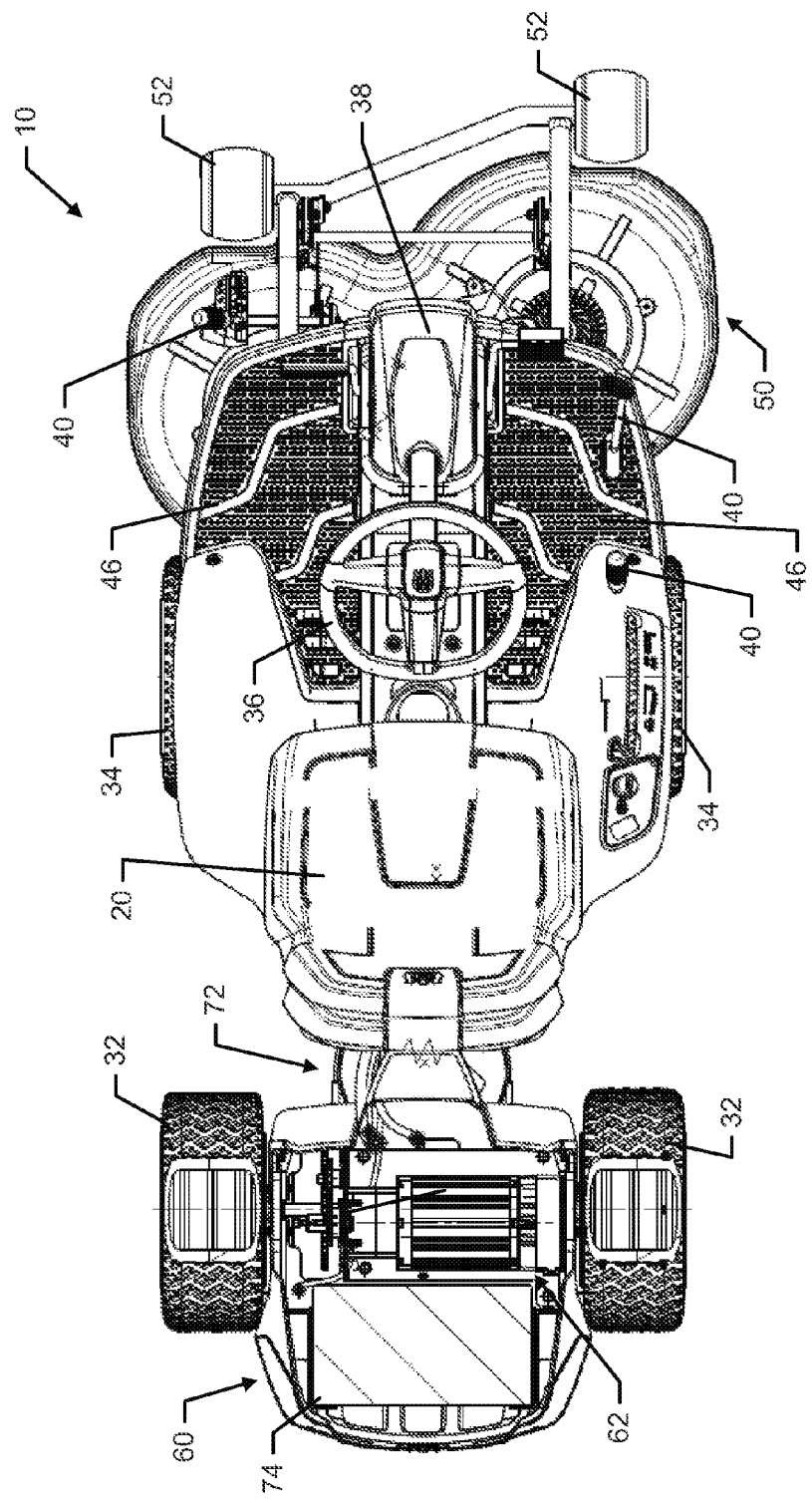
FIG. 1B illustrates a top view of the riding lawn care vehicle according to an example embodiment.

FIG. 1, which includes FIGS. 1A and 1B, illustrates a battery powered riding lawn care vehicle 10 having an efficient drive controller according to an example embodiment. In this regard, FIG. 1A illustrates a side view of the battery powered riding lawn care vehicle 10 according to an example embodiment, and FIG. 1B illustrates a top view of the battery powered riding lawn care vehicle 10 according to an example embodiment. In some embodiments, the battery powered riding lawn care vehicle 10 may include seat 20 that may be disposed at a center, rear or front portion of the battery powered riding lawn care vehicle 10. The battery powered riding lawn care vehicle 10 may also include a steering assembly 30 (e.g., a steering wheel, handle bars, or the like) functionally connected to the wheels of the battery powered riding lawn care vehicle 10 to which steering inputs are provided. In some cases, the steering inputs may be provided to rear wheels 32 of the battery powered riding lawn care vehicle 10 to allow the operator to steer the battery powered riding lawn care vehicle 10. Since steering control is provided to the rear wheels 32, the front wheels 34 may not receive steering inputs in some embodiments. The operator may sit on the seat 20, which may be disposed to the rear of the steering assembly 30 to provide input for steering of the battery powered riding lawn care vehicle 10 via the steering assembly 30.

In an example embodiment, the steering assembly 30 may include a steering wheel 36 and a steering column 37. The steering column 37 may operably connect to additional steering assembly components described in greater detail below. Moreover, in some embodiments, the steering column 37 may extend into a steering console 38, which may provide a cover to improve the aesthetic appearance of the battery powered riding lawn care vehicle 10 by obscuring the view of various mechanical components associated with the steering assembly 30. The battery powered riding lawn care vehicle 10 may also include additional control related components 40 such as one or more speed controllers, cutting height adjusters and/or cutting unit lifting controllers. Some of these controllers may be provided in the form of foot pedals that may sit proximate to a footrest 46 (which may include a portion on both sides of the battery powered riding lawn care vehicle 10 (e.g., on opposite sides of the steering console 38)) to enable the operator to rest his or her feet thereon while seated in the seat 20.

In some example embodiments, the steering assembly 30 may be embodied as an assembly of metallic or other rigid components that may be welded, fitted, bolted or otherwise operably coupled to each other and coupled to the wheels (rear wheels 32 in this example) of the battery powered riding lawn care vehicle 10 to which steering inputs are provided. For example, the steering assembly 30 may include or otherwise be coupled with a steering cable assembly or a system of mechanical linkages to translate rotational motion applied to the steering assembly 30 (and more particularly to the steering wheel 36) into directional inputs to orient the wheels (e.g., rear wheels 32) accordingly. In the illustrated embodiment, the riding lawn mower has an articulated frame 70 where the front wheels 34 are rotatably mounted to a front frame portion and the rear wheels 32 are rotatably mounted to a rear frame portion. The rear frame portion and the front frame portion are joined at articulated joint 72 so that the rear frame portion can pivot with respect to the front frame portion in response to steering input in order to reorient the rear wheels 32 relative to the front wheels 34. Other steering control systems may be employed in some alternative embodiments.

Figure 2:
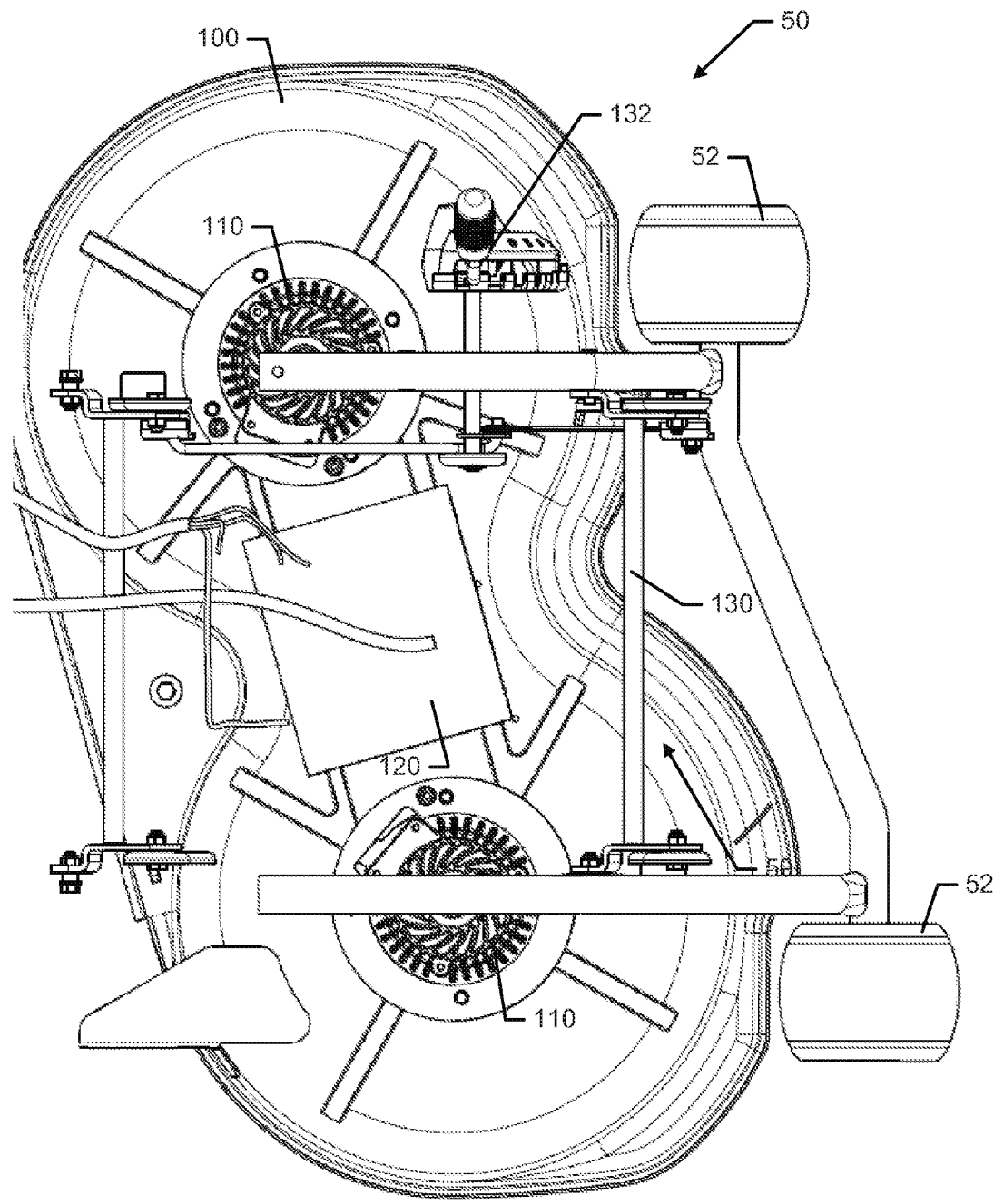
FIG. 2 illustrates portions of a cutting deck of the riding lawn care vehicle according to an example embodiment.

The battery powered riding lawn care vehicle 10 may also include, or be configured to support attachment of, a cutting deck 50 having at least one cutting blade mounted therein. FIG. 2 illustrates portions of the cutting deck 50 according to an example embodiment. The cutting deck 50 may be a removable attachment that may be positioned in front of the front wheels 34 in a position to enable the operator to cut grass using the cutting blade when the cutting blade is rotated below the cutting deck 50 and the cutting deck 50 is in a cutting position. When operating to cut grass, the grass clippings may be captured by a collection system, mulched, or expelled, from the cutting deck 50 via either a side discharge or a rear discharge.

In some embodiments, the cutting deck 50 may be elevated or lifted out of direct contact with the ground via a cutting unit lifting controller. In this regard, the cutting unit lifting controller may be a foot pedal or hand operated lever that operates linkages to lift or tilt the cutting deck 50 upward. Lifting the cutting deck 50 may enable the battery powered riding lawn care vehicle 10 to traverse certain rough terrain or obstacles (e.g., small rocks, curbs, or other features) or may otherwise be preferable for some operators when in a transit mode, or when the battery powered riding lawn care vehicle 10 is not actively being used in a cutting operation. However, other embodiments may not include any such cutting deck 50 lifting option, but may simply allow the height of blades within the cutting deck 50 to be adjusted using a cutting height adjuster (e.g., adjuster 132 in FIG. 2). In this regard, the cutting height adjuster may be a lever that is operably connected to the blades via linkages (not shown in FIG. 1) to adjust the height of the blades relative to the ground when the cutting deck 50 is lowered into a cutting position. In some embodiments, the cutting deck 50 itself may include wheels 52 to help ensure that the cutting deck 50 stays relatively level during operation to provide an even cut.

In embodiments in which the cutting deck 50 is removable, the cutting deck 50 may include blade drive components (e.g., belts, pulleys, a blade motor or other components) that may be used to functionally operate the cutting deck 50 during a cutting operation. The cutting deck 50 may mate with a portion of the battery powered riding lawn care vehicle 10 via a cutting deck mounting assembly configured to mate with the battery powered riding lawn care vehicle 10 to join the cutting deck 50 to the battery powered riding lawn care vehicle 10 to enable the cutting deck 50. FIG. 1 illustrates the battery powered riding lawn care vehicle 10 with the cutting deck 50 attached.

In the pictured example embodiment of Ha 1, drive motor compartment 60 of the battery powered riding lawn care vehicle 10 may be disposed to the rear of a seated operator to house various components of the battery powered riding lawn care vehicle 10 including an electric drive motor 62. However, in other example embodiments, the drive motor compartment 60 could be in different positions such as in front of the operator or below the operator. In some embodiments, the electric drive motor 62 may be operably coupled to one or more of the wheels of the battery powered riding lawn care vehicle 10 (the rear wheels 32 in this example) in order to provide drive power for the battery powered riding lawn care vehicle 10. Although the electric drive motor 62 may be capable of powering the rear wheels 32, in other alternative embodiments, the electric drive motor 62 may power all four wheels of the battery powered riding lawn care vehicle 10 (e.g., in cases where the battery powered riding lawn care vehicle 10 is not articulated). Moreover, in some cases, the electric drive motor 62 may manually or automatically shift between powering either two wheels or all four wheels of the battery powered riding lawn care vehicle 10.

In an example embodiment, the electric drive motor 62, the steering assembly 30, the cutting deck 50, the seat 20 and other components of the battery powered riding lawn care vehicle 10 may be operably connected (directly or indirectly) to a frame 70 of the battery powered riding lawn care vehicle 10. The frame 70 may be a rigid structure configured to provide support, connectivity and interoperability functions for various ones of the components of the battery powered riding lawn care vehicle 10. In some embodiments, the frame 70 may be split or articulated such that, for example, the front wheels 34 are disposed on an opposite portion of the frame 70 than the portion of the frame on which the back wheels 32 are disposed with respect to an articulated joint 72 in the frame 70.

The battery powered riding lawn care vehicle 10 may also include a battery power source 74. The battery power source 74 may include one or more batteries that may provide power for all electrical components of the battery powered riding lawn care vehicle 10. In cases in which multiple batteries are combined to form the battery power source 74, the batteries may be distributed or collocated near one another. In an example embodiment, three twelve volt batteries may be employed connected in series and their locations may be distributed throughout the battery powered riding lawn care vehicle 10. For example, one or more batteries may be disposed in the drive motor compartment 60, while other batteries may be disposed under the seat 20 or in other locations of the battery powered riding lawn care vehicle 10. The battery power source 74 may include lead acid batteries, or other types of batteries, and may be rechargeable or disposable in various alternative embodiments. By employing the battery power source 74, the battery powered riding lawn care vehicle 10 may avoid using fossil fuels and/or operate with reduced overall noise.

Referring now to FIG. 2, the cutting deck 50 (viewed from above in FIG. 2) may include a blade housing 100, that may house one or more cutting blades (not shown). The cutting blades may turn responsive to rotary motive forces applied by corresponding one or more blade drive motors 110. In some examples, there may be one blade motor provided for each blade. However, other embodiments could use a single blade motor to turn multiple blades. In the example of FIG. 2, there are two blade drive motors 110 shown for turning two corresponding blades within the blade housing, but other embodiments may employ less or more blades and corresponding blade motors. The blade motors 110 may be controlled via one or more blade motor controllers 120. In some examples, the blade motor controllers 120 may be disposed substantially between the blade motors 110 and may receive power from the battery power source 74.

A cutting deck mounting assembly 130 may be provided for attachment of the cutting deck 50 to the battery powered riding lawn care vehicle 10. The cutting deck mounting assembly 130 may suspend the blade housing (and therefore also the cutting blades) relative to the ground. In some embodiments, the cutting deck mounting assembly 130 may be supported by the wheels 52 of the cutting deck 50 and/or by attachment to the battery powered riding lawn care vehicle 10. In an example embodiment, adjuster 132 may be utilized to change the height of the cutting blades via adjustment of the distance between the cutting deck mounting assembly 130 and the blade housing 100.

Figure 3:
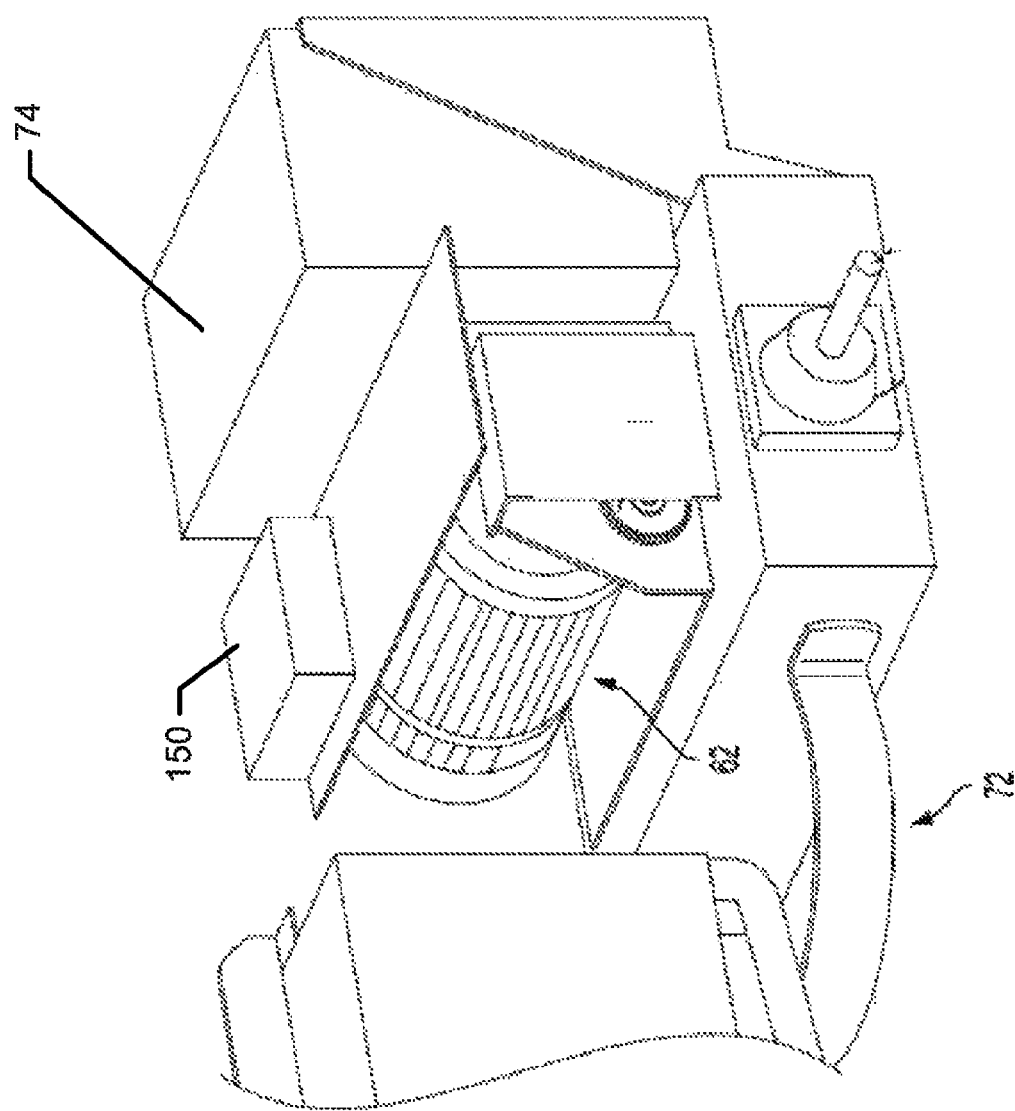
FIG. 3 illustrates a perspective view of some components of the riding lawn care vehicle according to an example embodiment.

In an example embodiment, controllers for both the blade motors HO and the motor controller for the electric drive motor 62 may be powered from the battery power source 74. Current drawn from the battery power source 74 may be monitored by one or more sensors of a sensor network. The sensor network may include a plurality of sensors disposed in corresponding locations and configured to detect parameters associated with various operational conditions related to the battery powered riding lawn care vehicle 10. Parametric data gathered by the sensor network may then be provided to a drive controller 150 that may be configured to process the parametric data and control operation of the blade motors 110 and the electric drive motor 62 based at least in part on the parametric data received. Although the drive controller 150 may be disposed nearly anywhere on the battery powered riding lawn care vehicle 10, one example embodiment may provide the drive controller in a location proximate to the battery power source 74. For example, FIG. 3 illustrates a perspective view of some of the components of the battery powered riding lawn care vehicle 10. In this regard, FIG. 3 shows the drive controller 150 disposed between two batteries of the battery power source 74 on top of the electric drive motor 62.

In an example embodiment, the sensor network may include one or more current sensors configured to detect the total current drawn from the battery power source 74. Accordingly, for example, in some cases a single current sensor may be used to detect the total current drawn from the battery power source 74. However, in other examples, multiple current sensors may be provided to detect different component currents that may be summed to determine the total current drawn by the battery power source 74. In some cases, the current sensor (or sensors) may be embodied as a voltage sensor measuring voltage across a resistor (e.g., a shunt resistor) of a known value. As such, the voltage measured may be indicative of the corresponding current. The sensor network may also sense other parameters such as the presence of an operator on the seat 20, blade motor running status (e.g., for determining working time), drive motor running status (e.g., for determining drive time), and various fault conditions that may impact battery powered riding lawn care vehicle 10 operation.

Figure 4:
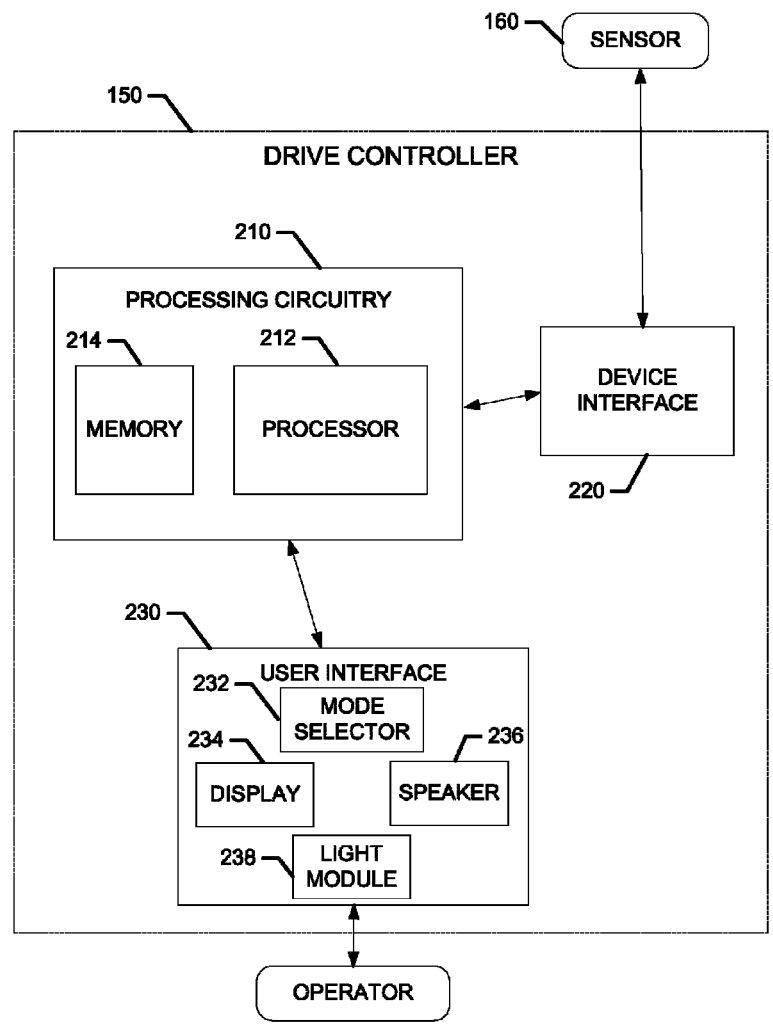
FIG. 4 illustrates a block diagram of various components of the battery powered riding lawn care vehicle according to an example embodiment.

FIG. 4 illustrates a block diagram of various components of the battery powered riding lawn care vehicle 10 to illustrate operable coupling provided between various of such components and to facilitate description of an example embodiment. In some example embodiments, the drive controller 150 may include or otherwise be in communication with processing circuitry 210 that is configurable to perform actions in accordance with example embodiments described herein. As such, for example, the functions attributable to the drive controller 150 may be carried out by the processing circuitry 210.

The processing circuitry 210 may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include a processor 212 and memory 214 that may be in communication with or otherwise control a device interface 220 and, in some cases, a user interface 230. As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer.

The user interface 230 (if implemented) may be in communication with the processing circuitry 210 to receive an indication of a user input at the user interface 230 and/or to provide an audible, visual, mechanical or other output to the user. As such, the user interface 230 may include, for example, a display (e.g., a touch screen), one or more buttons or keys, and/or other input/output mechanisms. In some embodiments, the user interface 230 may be provided on a fender panel (e.g., positioned proximate to the seat 20), on a portion of the steering wheel 36, on a portion of the steering console 38, or at another location on the battery powered riding lawn care vehicle 10.

The device interface 220 may include one or more interface mechanisms for enabling communication with other devices (e.g., sensors of the sensor network and/or motor controllers of the blade motors 110 and/or the electric drive motor 62). In some cases, the device interface 220 may be any means such as a device or circuitry embodied in either hardware, or, a combination of hardware and software that is configured to receive and/or transmit data from/to sensors (e.g., sensor 160) and/or motor controllers in communication with the processing circuitry 210.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the drive controller 150 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 114 may include one or more databases that may store a variety of data sets responsive to input from the sensor network. Among the contents of the memory 214, applications may be stored for execution by the processor 212 in order to carry out the functionality associated with each respective application. In some cases, the applications may include control applications that utilize parametric data to control one or more of the blade motors 110 and/or the electric drive motor 62 as described in greater detail below.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the drive controller 150. As such, in some embodiments, the processor 212 (or the processing circuitry 210) may be said to cause each of the operations described in connection with the drive controller 150 by directing the drive controller 150 to undertake the corresponding functionalities responsive to execution of instructions or algorithms configuring the processor 212 (or processing circuitry 210) accordingly. As an example, the drive controller 150 may be configured to control drive speed of the battery powered riding lawn care vehicle 10 as described herein.

The drive controller 150 may be capable of providing control signals to one or both of the blade motors 110 and the electric drive motor 62 in accordance with control applications anchor instructions defining parametric inputs and corresponding control actions to be taken for certain parametric input signals or combinations thereof. In an example embodiment, the drive controller 150 may be configured to receive indications of total current and provide control signals to the electric drive motor 62 based on the indications received. As such, for example, the drive controller 150 may include parametric tables defining ranges and/or values of total current measurements and corresponding control functions to be taken responsive to detection of total current measurements being sensed by the sensor network within the defined ranges or at the defined values. The ranges and/or values defined in the parametric tables may correspond to conditions for providing optimal or desirable cutting performance and/or conditions for maximizing battery power source 74 life.

In some embodiments, the control functions may include the provision of speed control signals to the electric drive motor 62. The speed control signals may include instructions that cause the electric drive motor 62 to slow down in response to receipt of indications that total current exceeds a threshold value. In this regard, in some embodiments, the blade motors 110 may be operated at a fixed speed (e.g., top speed, most efficient speed, etc.) by the corresponding blade motor controllers 120. Thus, control signals issued based on total current may be limited to control signals that cause the electric drive motor 62 to slow down when total current is above the threshold value. In some cases, total current may include the current drawn by the blade drive motors 110 and the electric drive motor 62. While total current may also include current drawn by peripheral devices such as gauges, displays, lights, and/or the like, the contribution of peripheral devices to total current may generally be negligible given the relative scale of the values involved. Thus, when total current exceeds the threshold value, such occurrence may indicate that the blade motors 110 are drawing a high current due to encountering an obstacle, thick grass, wet grass, or other conditions that require additional current to be provided to the blade motors 110 in order to attempt to maintain the speed of rotation of the blade motors 110. To achieve an optimal or even cutting performance from the battery powered riding lawn care vehicle 10, a reduction in drive speed may be desired. Thus, when thick or wet grass is encountered, the drive speed may be reduced in order to maintain total current within ranges defined by the drive controller 150 and to achieve improved cutting performance. Similarly, in embodiments where the battery powered riding lawn care vehicle 10 encounters a steep grade or an obstacle, the electric drive motor 62 may draw increased current in an attempt to maintain speed while traversing the steep grade or obstacle. If the total current drawn exceeds the threshold, value, the drive controller 150 may reduce drive speed to reduce the load on the electric drive motor 62 to desirable levels for maximizing or improving battery life.

Accordingly, by monitoring total current, the drive controller 150 may account for situations that impact either or both of the electric drive motor 62 and the blade drive motors 110 when controlling drive speed to improve cutting performance and/or improve battery performance. In some embodiments, the drive controller 150 may automatically insert control signals to control drive speed (e.g., by slowing down the electric drive motor 62) based on total current. In this regard, the drive controller 150 may automatically slow down the electric drive motor 62 when total current exceeds a threshold value. In other embodiments, the drive controller 150 may be configured to control electric drive motor 62 operation based on the total current received beyond merely providing inputs to slow drive speed when total current exceeds the threshold value. For example, the drive controller 150 may be configured to define specific speed control inputs for corresponding ranges of total current. In this regard, the speed control inputs may be determined based on test data to correspond to optimal performance characteristics for corresponding ranges of total current values. For example, the speed control inputs for each respective total current range may define speeds that optimize or improve cutting performance and/or battery life based on test data.

In an example embodiment, a mode of operation of the drive controller 150 may be selectable by the operator (e.g., via the user interface 230). Operational modes may include an automatic operation mode and a manual operation mode. The drive controller 150 may also be turned off completely in some cases. The automatic operation mode may include the automatic control of drive speed based on total current. Furthermore, the automatic operation mode may include a static control mode in which the drive controller 150 monitors total current relative to the threshold value and reduces speed responsive to the total current exceeding the threshold value. Alternatively, or additionally, the automatic operation mode may include a dynamic control mode in which the drive controller 150 controls speed dynamically based on total current in order to optimize performance.

In some embodiments, the manual operation mode may also include either or both of a static control mode or a dynamic control mode. In the manual operation mode, the drive controller 150 may monitor total current and provide non-control related outputs based on the total current values determined. For example, if total current is below the threshold value in the static control mode, the drive controller 150 may provide a positive indication (e.g., a green light or series of lights, a textual output indicative of the corresponding situation, an audible output (or lack thereof), a gauge output indicating in-band operation and/or the like) via the user interface 230. Meanwhile, for example, if total current is within an allowable band for the current drive speed, the positive indication may be generated in the dynamic control mode. However, if the total current exceeds the threshold (static control) or is outside of a desirable range (dynamic control), the drive controller 150 may be configured to provide a negative indication (e.g., a yellow or red light or series of lights, a textual output indicative of the corresponding situation, an audible output, a gauge output indicating out-of-band operation and/or the like). However, in all cases during employment of the manual operation mode, the drive controller 150 may merely indicate a condition of the total current measured, but may not provide automatic control of drive speed. Instead, the indications provided to the operator may be used by the operator to manually control the speed of the battery powered riding lawn care vehicle 10. For example, the operator may attempt to control drive speed manually to maintain or restore the positive indication. As such, for example, if a negative indication is received, the operator may be alerted so that the operator can take action to restore the positive indication.

Accordingly, the user interface 230 may include an input mechanism for mode selection (e.g., mode selector 232). Mode selector 232 may be a button, selectable option on a display, lever, switch, or other operator selectable mechanism. In some embodiments, the user interface 230 may also include one or more output mechanisms. The output mechanisms may include a display 234, which could be an LCD display or the like. In some examples, the display 234 may be a touch screen. In an example embodiment, the output mechanism may include a speaker 236 or other source of audible instructions. In some cases, the output mechanism may include a light module 238 that may include one or more lights. The lights may be LED lights or may be presented on the display 234.

In an example embodiment, the light module 238 may include a series of lights that may alter their colors based on inputs (e.g., positive or negative indications) from the drive controller 150. For example, the light module 238 may include a green light to indicate "efficient" running, which may indicate that the total battery current is below the threshold value, or otherwise within the ranges set for the current operating conditions as sensed by the drive controller 150. The light module 238 may also include a red light to indicate "inefficient" running, which may indicate that total battery current has exceeded the threshold value or is outside of the ranges set for current operating conditions as sensed by the drive controller 150. In some embodiments, red lights may be provided on each side of the green lights in order to indicate whether current operating conditions are running "inefficient" low (e.g., red light to left of green light lit) or high (e.g., red light to right of green light lit). Thus, for example, the operator may receive feedback that may either indicate corrective action being taken automatically (e.g., by the drive controller 150), or indicate a corrective action that may be taken in order to facilitate restoring operations to "efficient" operation (e.g., by adjusting speed until the green light is lit). In some embodiments, other light colors may be employed. Moreover, additional lights could be employed, such as, for example, yellow lights to indicate proximity to operating range limits or the threshold value.

In alternative embodiments, a gauge-like user interface may be displayed, which may define a green band, yellow band, and/or red band to illustrate the current operating conditions relative to the threshold value and/or the range limits defined by the drive controller 150. Other mechanisms for displaying operating conditions relative to operating ranges and/or thresholds may also or alternatively be employed in other example embodiments.

Accordingly, some example embodiments of the present invention may provide an efficient drive controller that may be configured to monitor operating conditions of a battery operated riding lawn care vehicle and compare the operating conditions (or parameters) being monitored to operational set points, guidelines, operating ranges, and/or thresholds in order to facilitate control of battery operated riding lawn care vehicle operation to improve cutting efficiency and/or battery life. In some cases, the efficient drive controller may be configured to take automatic control of vehicle drive speed based on total battery current drawn (e.g., by drive motor components and blade motor components) to ensure conformance with predefined operating ranges and/or to ensure that predefined operating limits or thresholds are not exceeded. Alternatively or additionally, the efficient drive controller may provide indications to the operator to inform or guide the operator with respect to operating conditions relative to predefined operating ranges and/or predefined operating limits or thresholds based on total battery current or other operating parameters.

Figure 5:
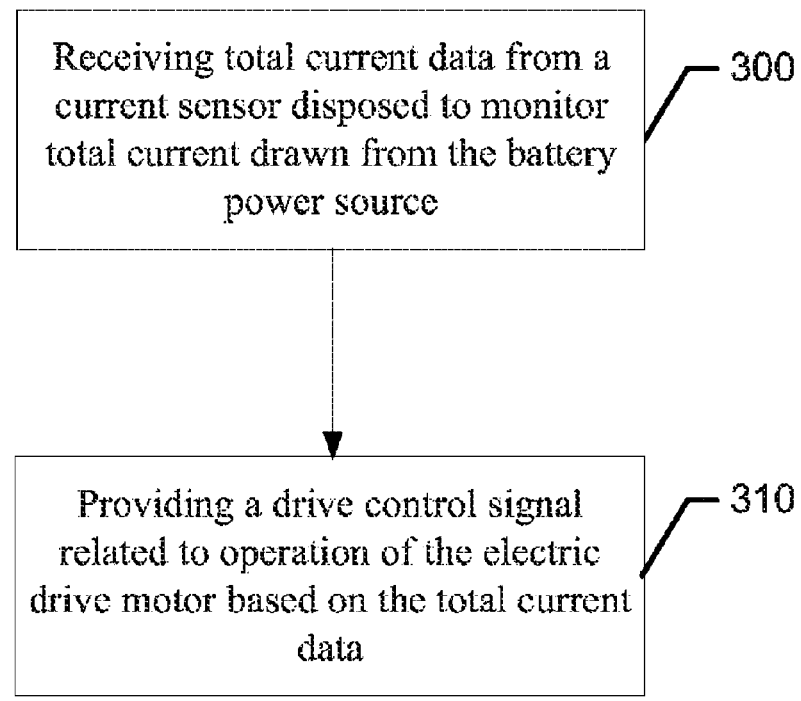
FIG. 5 is a block diagram illustrating a method of controlling drive speed of a riding lawn care vehicle according to an example embodiment.

In another example embodiment, a method of controlling drive speed of a riding lawn care vehicle is provided. In this regard, FIG. 5 is a block diagram illustrating a method of controlling drive speed of a riding lawn care vehicle according to an example embodiment. The riding lawn care vehicle may include a battery power source, an electric drive motor and at least one blade motor powered by the battery power source. The electric drive motor may be operably coupled to wheels of the riding lawn care vehicle to provide drive power for the riding lawn care vehicle. The at least one blade drive motor may be operably coupled to at least one cutting blade of the riding lawn care vehicle. The method may include receiving total current data from a current sensor disposed to monitor total current drawn from the battery power source at operation 300 and providing a drive control signal related to operation of the electric drive motor based on the total current data at operation 310.

Figure 6:
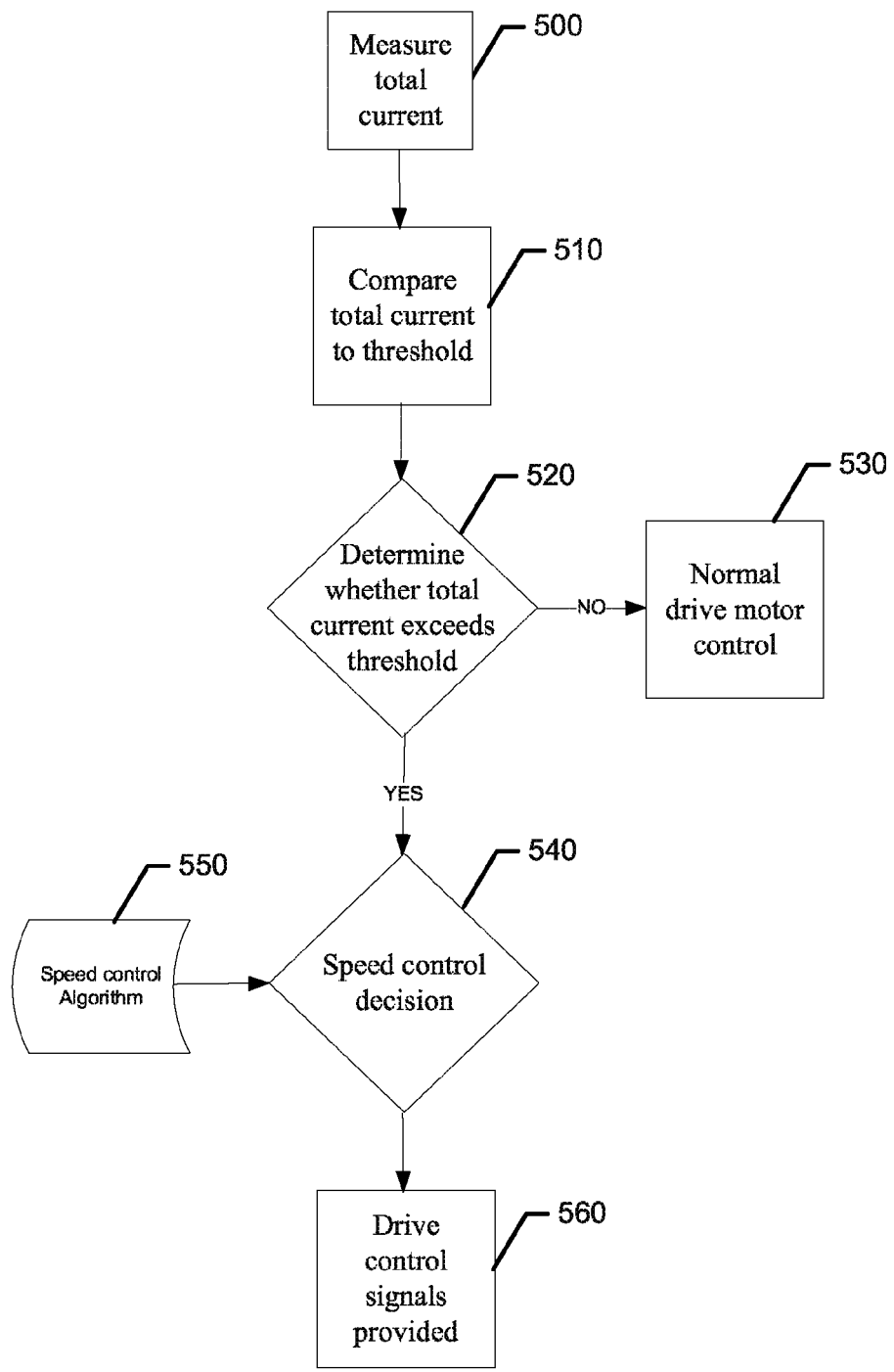
FIG. 6 is a block diagram illustrating a more detailed method of controlling drive speed of a riding lawn care vehicle according to one example embodiment.
Figure 7:
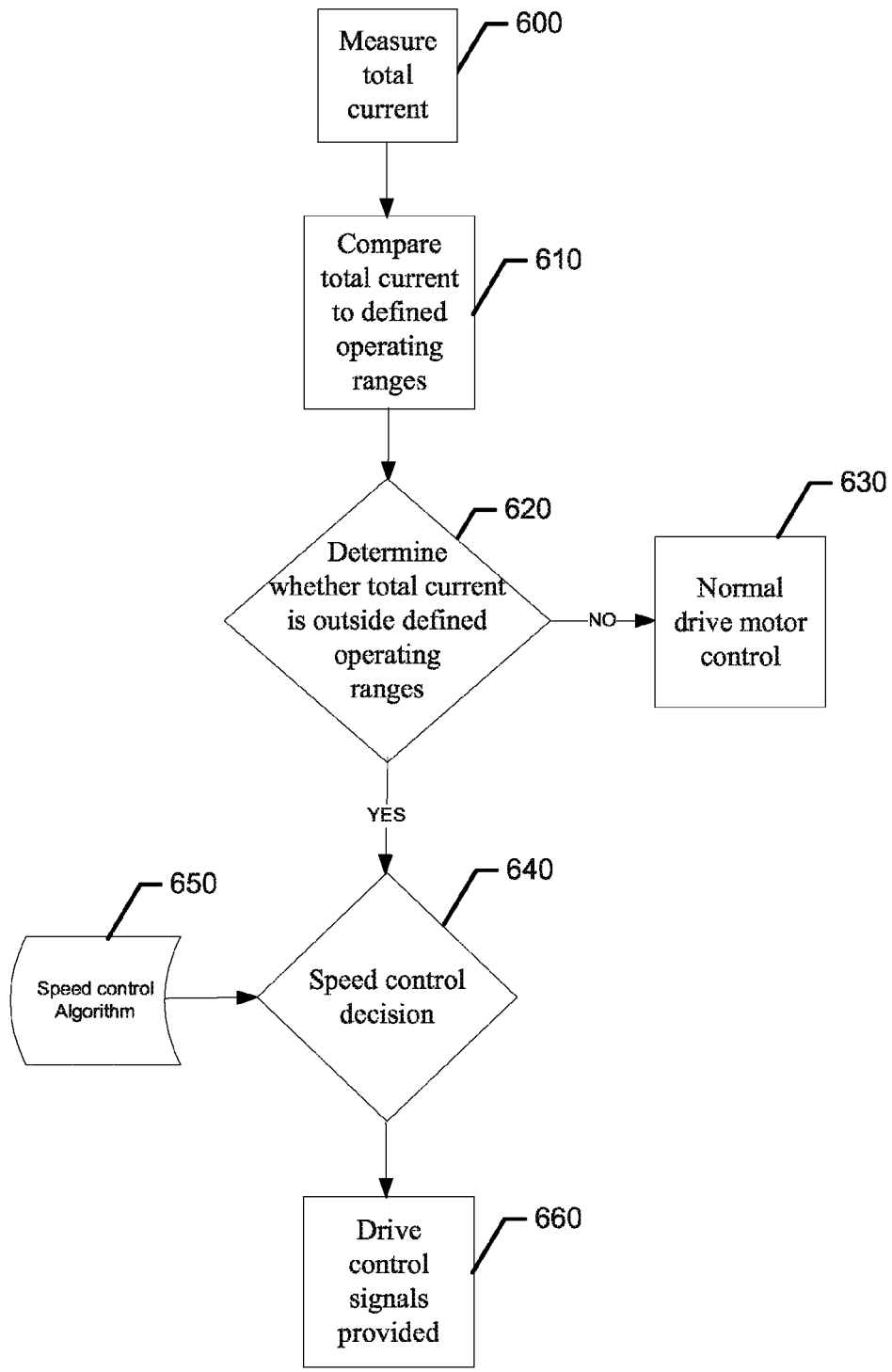
FIG. 7 is a block diagram illustrating another more detailed method of controlling drive speed of a riding lawn care vehicle according to an alternative example embodiment.

FIGS. 6 and 7 illustrate more detailed methods of controlling drive speed of a riding lawn care vehicle according to various example embodiments. In this regard, as shown in FIG. 6, one example method may include measuring total current at operation 500. The total current may then be compared to a threshold at operation 510. A determination may be made as to whether the total current exceeds the threshold at operation 520. If the total current does not exceed the threshold, normal drive motor control may continue at operation 530. However, if the total current exceeds the threshold, a speed control decision may be made at operation 540. In some embodiments, a speed control algorithm may be applied at operation 550 to utilize linear or nonlinear based speed control algorithms to decrease drive motor speed when the total current exceeds the threshold. In some cases, the amount of overshoot beyond the threshold may impact the speed control decision. At operation 560, drive control signals may be provided to the electric drive motor based on the speed control decision.

In an alternative example embodiment, shown in FIG. 7, the method may include measuring total current at operation 600. The total current may then be compared to operating ranges at operation 610. A determination may be made as to whether the total current is within defined operating ranges at operation 620. If the total current is within defined operating ranges, normal drive motor control may continue at operation 630. However, if the total current is outside of the defined operating ranges, a speed control decision may be made at operation 640. In some embodiments, a speed control algorithm may be applied at operation 650 to utilize linear or nonlinear based speed control algorithms to adjust drive motor speed when the total current is outside of the defined operating ranges. In some cases, the degree to which the total current is outside of the defined operating ranges may impact the speed control decision. At operation 660, drive control signals may be provided to the electric drive motor based on the speed control decision.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding lawn care vehicle comprising:
   a battery power source;
   an electric drive motor powered by the battery power source, the electric drive motor being operably coupled to a wheel of the riding lawn care vehicle to provide drive power for the riding lawn care vehicle;
   at least one blade drive motor powered by the battery power source, the at least one blade drive motor being operably coupled to at least one cutting blade of the riding lawn care vehicle;
   a current sensor disposed to monitor total current drawn from the battery power source; and
   a drive controller receiving total current data from the current sensor and providing a drive control signal related to operation of the electric drive motor based on the total current data.

2. The riding lawn care vehicle of claim 1, wherein the drive controller is configured to receive the total current data and compare the total current data to a threshold value, and wherein the drive controller is configured to communicate the drive control signal as a direction to change a speed of the electric drive motor in response to the threshold value being exceeded.

3. The riding lawn care vehicle of claim 2, wherein the drive control signal is a direction to slow down the electric drive motor.

4. The riding lawn care vehicle of claim 1, wherein the drive controller is configured to receive the total current data and compare the total current data to a predefined operational range for the riding lawn care vehicle, and wherein the drive controller is configured to communicate the drive control signal as a direction to change a speed of the electric drive motor in response to total current being outside of the predefined operational range.

5. The riding lawn care vehicle of claim 4, wherein the drive control signal is a direction to slow down the electric drive motor.

6. The riding lawn care vehicle of claim 1, further comprising-user interface disposed at a portion of the riding lawn care vehicle to enable an operator seated on the riding lawn care vehicle to enable an operation mode of the drive controller to be selected.

7. The riding lawn care vehicle of claim 6, wherein the operation mode of the drive controller is selectable as an automatic mode or a manual mode.

8. The riding lawn care vehicle of claim 7, wherein the drive control signal is automatically provided to the electric drive motor in the automatic mode.

9. The riding lawn care vehicle of claim 7, wherein an indication indicative of the drive control signal is provided via the user interface in response to the electric drive motor being in the manual mode.

10. The riding lawn care vehicle of claim 6, wherein the user interface is disposed proximate to a seat of the riding lawn care vehicle, proximate to a steering column of the riding lawn care vehicle, or at a portion of a steering wheel of the riding lawn care vehicle.

11. A drive controller for a riding lawn care vehicle comprising a battery power source, an electric drive motor, powered by the battery power source, and at least one blade drive motor, wherein the electric drive motor is operably coupled to a wheel of the riding lawn care vehicle to provide drive power for the riding lawn care vehicle, and the at least one blade drive motor is operably coupled to at least one cutting blade of the riding lawn care vehicle, the drive controller comprising:
   a device interface configured to receive total current data from a current sensor disposed to monitor total current drawn from the battery power source; and
   processing circuitry configured to receive total current data from the device interface and provide a drive control signal related to operation of the electric drive motor based on the total current data.

12. The drive controller of claim 11, wherein the processing circuitry is configured to receive the total current data and compare the total current data to a threshold value, and wherein the processing circuitry is configured to communicate the drive control signal as a direction to change a speed of the electric drive motor in response to the threshold value being exceeded.

13. The drive controller of claim 12, wherein the drive control signal is a direction to slow down the electric drive motor.

14. The drive controller of claim 11, wherein the processing circuitry is configured to receive the total current data and compare the total current data to a predefined operational range for the riding lawn care vehicle, and wherein the processing circuitry is configured to communicate the drive control signal as a direction to change a speed of the electric drive motor in response to total current being outside of the predefined operational range.

15. The drive controller of claim 14, wherein the drive control signal is a direction to slow down the electric drive motor.

16. The drive controller of claim 11, further comprising a user interface disposed at a portion of the riding lawn care vehicle to enable an operator seated on the riding lawn care vehicle to enable an operation mode of the drive controller to be selected.

17. The drive controller of claim 16, wherein the operation mode of the drive controller is selectable as an automatic mode or a manual mode.

18. The drive controller of claim 17, wherein the drive control signal is automatically provided to the electric drive motor in the automatic mode.

19. The drive controller of claim 17, wherein an indication indicative of the drive control signal is provided via the user interface in response to the electric drive motor being in the manual mode.

20. The drive controller of claim 16, wherein the user interface is disposed proximate to a seat of the riding lawn care vehicle, proximate to a steering column of the riding lawn care vehicle, or at a portion of a steering wheel of the riding lawn care vehicle.

21. A method of controlling drive speed of a riding lawn care vehicle, the riding lawn care vehicle comprising a battery power source, an electric drive motor powered by the battery power source, and at least one blade motor, wherein the electric drive motor is operably coupled to a wheel of the riding lawn care vehicle to provide drive power for the riding lawn care vehicle, and the at least one blade drive motor is operably coupled to at least one cutting blade of the riding lawn care vehicle, the method comprising:

receiving total current data from a current sensor disposed to monitor total current drawn from the battery power source; and providing a drive control signal related to operation of the electric drive motor based on the total current data.

22. The method of claim 21, wherein providing the drive control signal comprises comparing the total current data to a threshold value and providing a direction to change a speed of the electric drive motor in response to the threshold value being exceeded.

23. The method of claim 21, further comprising enabling an operator seated on the riding lawn care vehicle to select an operation mode with respect to providing the drive control signal via a user interface disposed at a portion of the riding lawn care vehicle.

24. The method of claim 21, wherein the total current data comprises data about current drawn from the battery power source by the by the electric drive motor and the at least one blade drive motor.

25. A riding lawn care vehicle comprising:
a battery power source;
an electric drive motor powered by the battery power source, the electric drive motor being operably coupled to a wheel of the riding lawn care vehicle to provide drive power for the riding lawn care vehicle;
at least one blade drive motor powered by the battery power source, the at least one blade drive motor being operably coupled to at least one cutting blade of the riding lawn care vehicle;
a current sensor disposed to monitor current drawn from the battery power source by the electric drive motor and the at least one blade drive motor; and
a drive controller receiving current data from the current sensor and providing a drive control signal related to operation of the electric drive motor based on the current data.

26. The riding lawn care vehicle of claim 25, comprising at least two blade drive motors powered by the battery source, wherein each of the at least two blade drive motors is operably coupled to at least one cutting blade, and wherein the current sensor is disposed to monitor current drawn from the battery power source by the electric drive motor and the at least two blade drive motors.

* * * * *

UNITED STATES PATENT AND TRADEMARK OFFICE
CERTIFICATE OF CORRECTION

| | | |
|---|---|---|
| PATENT NO. | : 9,226,444 B2 | Page 1 of 1 |
| APPLICATION NO. | : 14/131837 | |
| DATED | : January 5, 2016 | |
| INVENTOR(S) | : Sebastian Schygge et al. | |

It is certified that error appears in the above-identified patent and that said Letters Patent is hereby corrected as shown below:

Claims

Column 15, line 23, claim 24 "source by the by the electric drive motor and the at least one" should read -- source by the electric drive motor and the at least one --.

Signed and Sealed this
Nineteenth Day of April, 2016

Michelle K. Lee
*Director of the United States Patent and Trademark Office*